United States Patent
Schirpke et al.

[11] Patent Number: 5,540,567
[45] Date of Patent: Jul. 30, 1996

[54] ASSEMBLY FOR CONVEYING A LIQUID MEDIUM, ESPECIALLY A HEAT CARRIER, IN THE COOLING AND HEATING CIRCUIT OF A MOTOR VEHICLE, WITH A MAGNETIC DRIVEN PUMP HAVING A MOISTURE PERMEABLE WALL BETWEEN MAGNETS

[75] Inventors: Bernd Schirpke; Gerd Lentz, both of Bühl; Christoph Heier, Iffezheim; Klaus Kiefer, Rheinau, all of Germany

[73] Assignee: Robert Bosch GmbH, Stuttgart, Germany

[21] Appl. No.: 256,688

[22] PCT Filed: Jan. 22, 1993

[86] PCT No.: PCT/DE93/00050

§ 371 Date: Jul. 20, 1994

§ 102(e) Date: Jul. 20, 1994

[87] PCT Pub. No.: WO93/16284

PCT Pub. Date: Aug. 19, 1993

[30] Foreign Application Priority Data

Feb. 6, 1992 [DE] Germany .................... 42 03 381.0

[51] Int. Cl.⁶ ........................... F04D 13/02; B60H 1/32
[52] U.S. Cl. ............................. 417/369; 417/420
[58] Field of Search ..................... 417/369, 420

[56] References Cited

U.S. PATENT DOCUMENTS 3,225,698  12/1965  Spisiak .................. 417/369
4,854,823  8/1989   Hatting ................ 417/420 X
4,871,301  10/1989  Buse .................... 417/420
5,090,944  2/1992   Kyo et al. ............. 417/420 X

FOREIGN PATENT DOCUMENTS 53-73893  1/1980  Japan ................... 417/369

*Primary Examiner*—Richard E. Gluck
*Attorney, Agent, or Firm*—Michael J. Striker

[57] ABSTRACT

The invention is directed to a unit serving to convey a liquid medium, in particular a heat carrier, in the cooling and heating system of a motor vehicle. The conveying unit has an electric drive motor for a conveying pump connected in the circuit, which drive motor has a collector and contact brushes contacting the bearing surface of the latter. The conveying member of the conveying pump is connected with one coupling half of a magnetic coupling so as to be fixed with respect to rotation relative to it and the motor armature is connected with the other coupling half so as to be fixed with respect to rotation relative thereto. A unit housing which preferably comprises a plurality of parts encloses a space receiving the motor and a chamber accommodating the conveying member of the pump. A favorable atmosphere is created in the motor space with respect to brush wear by arranging a wall between the two coupling halves, which wall divides the pump chamber from the motor space and allows moisture to pass through.

5 Claims, 2 Drawing Sheets

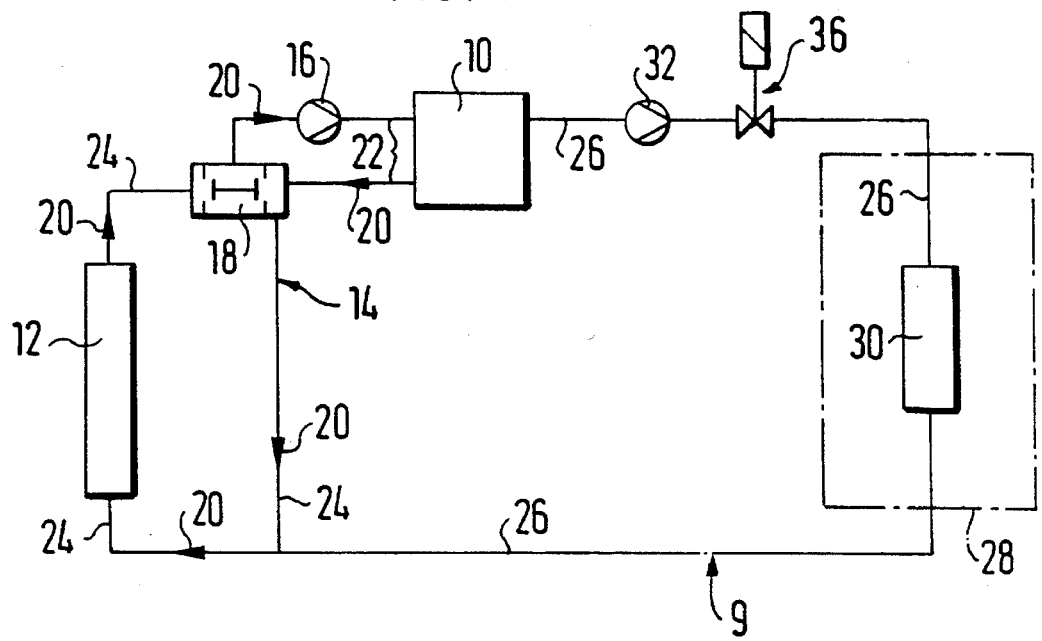
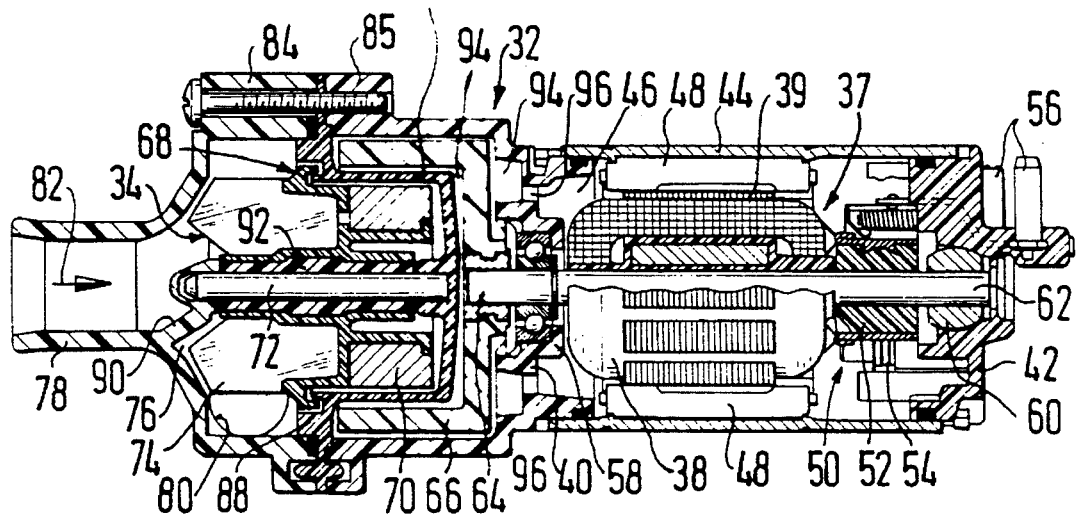

ASSEMBLY FOR CONVEYING A LIQUID MEDIUM, ESPECIALLY A HEAT CARRIER, IN THE COOLING AND HEATING CIRCUIT OF A MOTOR VEHICLE, WITH A MAGNETIC DRIVEN PUMP HAVING A MOISTURE PERMEABLE WALL BETWEEN MAGNETS

PRIOR ART

The invention is based on an assembly or unit according to the generic part of the main claim. Such a unit, in which a moisture-tight separating wall is located between the coupling halves of the magnetic coupling, is already available commercially. As a result of this construction, no moisture can escape from the circuit. The purpose-oriented arrangement of the conveying unit in the region of the radiating heat of the internal combustion engine of a motor vehicle results in a very dry atmosphere in the space around the drive motor which, as is well known, contributes substantially to brush wear when so-called graphite or carbon brushes are used. It has been shown that a moisture content of the air in the region of the carbon brushes amounting to 3 grams per cubic meter to 25 grams per cubic meter, but especially 8 to 15 grams per cubic meter, creates optimal hygrometric conditions with respect to carbon brush wear.

ADVANTAGES OF THE INVENTION

The conveying unit according to the invention with the characterizing features of the main claim has the advantage over the known unit that the small amount of liquid entering the motor space through the separating wall from the circuit creates a favorable atmosphere of this kind because this liquid passes through the wall in the form of vapor.

Advantageous further developments and improvements of the conveying unit indicated in the main claim are made possible by the steps contained in the subclaims. In a particularly advantageous manner, the wall which is permeable to moisture is made of plastic.

DRAWING

An embodiment example of the invention is shown in the drawing and explained more fully in the following description. FIG. 1 shows a schematic view of a cooling and heating circuit of a motor vehicle having a booster pump or auxiliary pump which is driven by an electric motor and supports the heating circuit; FIG. 2 shows a longitudinal section through a subject conveying unit with auxiliary pump and electric drive motor; and FIG. 3 shows a vehicle provided with the subject conveying unit.

DESCRIPTION OF THE EMBODIMENT EXAMPLE

Figure 3:
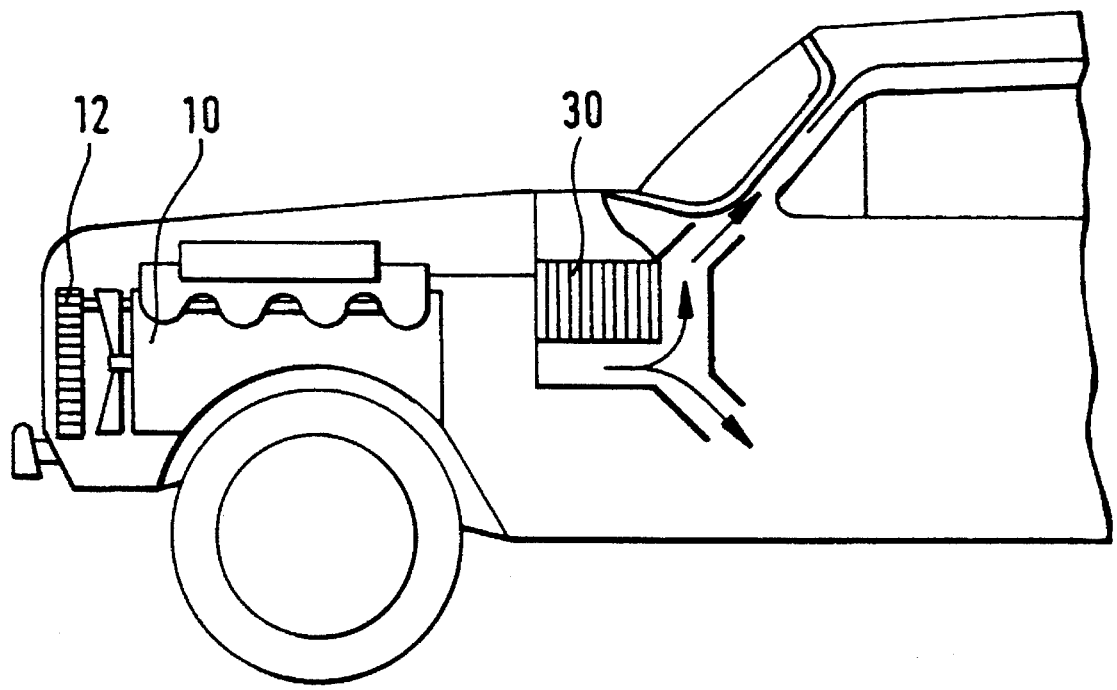

A cooling and heating circuit 9 of an internal combustion engine 10 of a motor vehicle shown in FIG. 1 has cooling means 12 connected to the internal combustion engine through lines via the cooling circuit 14. A water pump 16 driven by the internal combustion engine 10 and a thermostat valve 18 are arranged in the cooling circuit 14. During operation of the internal combustion engine 10, the water pump 16 conveys the liquid serving as heat carrier in the direction of arrow 20 through the cooling means 12, where the coolant water gives off a large portion of its heat so that it can again serve as coolant. When the internal combustion engine is still cold, the thermostat valve 18 ensures that the coolant circuit 14 at first remains limited to a small line circuit 22 until the coolant is heated to a suitable temperature. The thermostat valve 18 then opens and the coolant flows via the large coolant circuit 24 and is guided through the cooling means 18. A heating circuit 26 is associated with this coolant circuit 22 and 24. The heating circuit 26 leads through the passenger compartment 28 of the motor vehicle shown in FIG. 3 and flows through a heat exchanger 30. The heat exchanger 30 delivers heat to the passenger compartment 28. A conveying unit 32 containing a water pump 34 is provided for supporting the heating circuit 26. This conveying pump supports the flow of the heated coolant liquid arriving from the internal combustion engine 10 and presses it back through the heat exchanger 30 to the cooling circuit 22, 24 via a valve 36. Thus coolant liquid which is heated to the maximum temperature is guided to the heat exchanger 30 during operation of the internal combustion engine after the warm-up period and rapidly heats the passenger compartment 28 via the heat exchanger 30. In so doing, the auxiliary conveying unit 32 ensures a sufficient flow rate of heated liquid through the heat exchanger 30. When the passenger compartment 28 is suitably heated, the valve 36 blocks the heating line 26. At the same time, the conveying unit 32 is stopped.

The construction of the conveying unit 32 is shown in FIG. 2. It has an electric drive motor 37 whose armature 38 is supported in housing walls 40 and 42 located at the end sides. Further, the electric drive motor 37 has a tubular housing part 44 which forms a motor housing together with structural component parts 40 and 42.

Essential parts of the electric motor 37 are accommodated in a space 46 inside the motor housing 40, 42, 44. Permanent magnets 48 arranged at housing part 44 are accommodated in this space 46 along with the armature 38 and laminated armature core 39. Also located in this space is a commutator 50 of the drive motor 37 which, in addition to a collector drum 52, has contact brushes 54 which are constructed as carbon brushes and have connection means 56 arranged at the outside of the housing part 42 leading to an electric work circuit, not shown, for the drive motor 37. The housing parts 40 and 42 serve to receive bearings 58, 60 for the shaft 62 of the motor armature 38. The motor shaft 62 penetrates the housing wall 40, 58 with one end portion 64 to which is fastened the first half 66 of a magnetic coupling 68 on the motor side. This first coupling half 66 has a barrel-shaped construction. The second, cylinder-shaped coupling half 70 of the magnetic coupling 68 is arranged in the interior of the barrel. It sits on a pump shaft 72 which also carries the conveying member 74 of a conveying pump 34 constructed as a flow pump. The conveying member 74 rotates in a pump chamber 76 which is connected with the heating circuit 26 via a suction connection 78. Further, the conveying chamber 76 has an output 80 through which the heated coolant water exits the pump chamber 76 and returns to the heating circuit 26. The liquid flowing in is represented in FIG. 2 by arrow 82. The pump chamber 76 and connection piece 78 are associated with a pump housing 84. Located between the motor housing 40, 42, 44 and the pump housing 84 is an intermediate housing 84 connecting the pump housing with the motor housing. This intermediate housing 84 encloses substantial parts of the magnetic coupling 68 and could also be designated as the coupling housing. As is also shown in FIG. 2, a barrel-shaped wall 86 which penetrates deep into the barrel shape of the first coupling half 66 is arranged in the region of the magnetic coupling 68. This barrel-shaped intermediate wall 86 is clamped between the two housing parts 48 and 84 via an annular flange 88 located at the rim of the barrel. This intermediate wall 86 serves as a support for one end of the axle 72, whose other end is supported in a wall 90 of the pump housing 48. The conveying member 74 of the conveying pump 34 is connected with the second coupling half 70 so as to be fixed with respect to rotation relative thereto and is rotatably supported on the axle 72 via a shared bushing sleeve 92. The barrel-shaped intermediate wall 86 is manufactured from a plastic which allows a small amount of the pumped heating liquid to pass through. This small amount of liquid or steam flows into an intermediate space 94 which is defined by the intermediate wall 86 on one side and by the motor housing part 40 and housing part 84 on the other side. The first coupling half 66 which is made of a plastic-ferrite material rotates in the intermediate chamber 94 formed in this way while the conveying unit 32 is in operation. In so doing, the magnetic energy passing through the intermediate wall 86 causes the other, second coupling half 70 manufactured from hard ferrite to be carried along and the conveying member 74 of the conveying pump 34 is also set in rotation so as to initiate the conveying movement of member 74. A plurality of openings 96 connecting the intermediate chamber 94 with the motor space 46 are located in the housing wall 40 of the electric motor 37. Air passes out of the intermediate chamber 94 through these openings 96 into the space 46 of the electric motor. The revolving armature 38 supports this flow of air through the openings 96. Accordingly, a moisture-enriched atmosphere is formed in the space 46 which results in the advantages of the inventive construction of the conveying unit which were mentioned in the beginning. Depending on the selected plastic, the intermediate wall 86 can be dimensioned in such a way that the degree of air humidity falls within the range mentioned above. Undoubtedly, another contributory factor in this idea consists in the distance between the conveying unit, in particular the commutator side of the electric motor 37, and the internal combustion engine 10. The reason for this is that the space 46 of the electric motor 37 can be heated considerably by the radiation heat of the internal combustion engine 10, which contributes to an unfavorable atmosphere as concerns wear of the carbon brushes 54.

We claim:

1. A unit for conveying a liquid medium, especially heat carrier, in a cooling and heating circuit of a motor vehicle, the unit comprising an electric drive motor having a motor armature, a collector and contact brushes contacting a bearing surface of said collector; a conveying pump connectable in a circuit and driven by said electrical drive motor, said conveying pump having a conveying member; a magnetic coupling having one coupling half connected with said conveying member of said conveying pump so that said conveying member is fixed with respect to rotation relative to said one coupling half, and the other coupling half connected with said motor armature so that said motor armature is fixed with respect to rotation relative to said other coupling half; a housing enclosing a space for receiving said motor and said conveying member of said pump and defining a pump chamber and a motor space; and a wall arranged between said two coupling halves, said wall being moisture permeable and separating said pump chamber from said motor space.

2. A unit as defined in claim 1, wherein said housing is composed of a plurality of housing parts.

3. A unit as defined in claim 1, wherein said electric drive motor has an armature core; and further comprising a flange-like intermediate housing wall arranged between said armature core and said magnetic coupling, said intermediate housing wall having at least one opening connecting said motor space with an intermediate chamber which receives one of said coupling halves located at a side of said electric drive motor.

4. A unit as defined in claim 3, wherein said intermediate housing wall has a plurality of openings.

5. A unit as defined in claim 1, wherein said moisture permeable wall is composed of a plastic material.

\* \* \* \* \*